(12) United States Patent
Hirota et al.

(10) Patent No.: US 7,170,885 B2
(45) Date of Patent: Jan. 30, 2007

(54) PACKET SWITCHING METHOD AND APPARATUS THEREOF

(75) Inventors: Nagayuki Hirota, Ebina (JP); Hiroshi Sekino, Isehara (JP); Shigeki Morimoto, Atsugi (JP); Yoshihito Sako, Hadano (JP); Masashi Fukuda, Hadano (JP)

(73) Assignee: Hitachi, Ltd., Tokyo (JP)

( * ) Notice: Subject to any disclaimer, the term of this patent is extended or adjusted under 35 U.S.C. 154(b) by 893 days.

(21) Appl. No.: 10/361,817

(22) Filed: Feb. 11, 2003

(65) Prior Publication Data

US 2003/0123429 A1 Jul. 3, 2003

Related U.S. Application Data

(63) Continuation of application No. 09/321,121, filed on May 27, 1999, now Pat. No. 6,542,496.

(30) Foreign Application Priority Data

Jun. 30, 1998 (JP) ................................. 10-184486

(51) Int. Cl.
H04L 12/28 (2006.01)
H04L 12/56 (2006.01)
H04J 3/26 (2006.01)

(52) U.S. Cl. ...................... 370/351; 370/389; 370/390; 370/432

(58) Field of Classification Search ................ None
See application file for complete search history.

(56) References Cited

U.S. PATENT DOCUMENTS

| | | | | |
|---|---|---|---|---|
| 5,487,064 A | * | 1/1996 | Galand et al. | 370/392 |
| 5,602,841 A | * | 2/1997 | Lebizay et al. | 370/413 |
| 5,724,358 A | * | 3/1998 | Headrick et al. | 370/418 |
| 5,917,820 A | * | 6/1999 | Rekhter | 370/392 |
| 6,247,058 B1 | * | 6/2001 | Miller et al. | 709/234 |
| 6,275,492 B1 | * | 8/2001 | Zhang | 370/392 |
| 6,310,874 B1 | * | 10/2001 | Miller et al. | 370/379 |
| 6,349,097 B1 | * | 2/2002 | Smith | 370/390 |
| 6,370,119 B1 | * | 4/2002 | Basso et al. | 370/252 |
| 6,400,681 B1 | * | 6/2002 | Bertin et al. | 370/218 |
| 6,556,542 B1 | * | 4/2003 | Sudo et al. | 370/236.1 |
| 6,990,099 B1 | * | 1/2006 | Wilford | 370/392 |

* cited by examiner

Primary Examiner—Chirag G. Shah
(74) Attorney, Agent, or Firm—Mattingly, Stanger, Malur & Brundidge, P.C.

(57) ABSTRACT

A packet switching is performed according to a routing information for relaying particular packets which is produced by the route computation based on the information of a received packet and the kept parts-of-routing-information useful as a basis for the route computation. At this time, the route through which the packet is relayed is determined on the basis of the kept parts-of-routing-information before the route computation. Then, the received packet is relayed according to the determined route. Next, a new routing information is produced by the route computation based on the information of the received packet and the parts-of-routing-information. Thereafter, the succeeding packets of the same route are relayed on the basis of the new routing information.

13 Claims, 11 Drawing Sheets

| VERSION | HEADER LENGTH | KIND SERVICE | PACKET LENGTH | |
|---|---|---|---|---|
| FRAGMENT IDENTIFIER | | | FLAG | FRAGMENT OFFSET |
| DATAGRAM LIFE | | PROTOCOL | HEADER CHECK SUM | |
| SOURCE ADDRESS(SX) | | | | 210 |
| DESTINATION GROUP ADDRESS(GX) | | | | 211 |
| OPTION | | | PADDING | |

28 BITS
RANGE : 224.0.0.0~239.255.255.255

PACKET SWITCHING METHOD AND APPARATUS THEREOF

This is a continuation application of U.S. Ser. No. 09/321,121, filed May 27, 1999 now U.S. Pat. No. 6,542,496.

BACKGROUND OF THE INVENTION

The present invention generally relates to a packet switching method and apparatus in which information of a forwarding packet is used in routing, and particularly to a packet switching method and apparatus suitable for multicast communications.

The term "multicast communications" means that a packet addressed to a multicast group from one computer (node) is relayed and transmitted to a plurality of computers (nodes) belonging to the group. FIG. 1 is a diagram showing the concept of the multicast communications. As illustrated, a packet from a computer 150 of source S is relayed and transmitted through routers (packet switching devices) R1–R9 to all computers 151–157 associated with the same group G. Here, the group is the communication unit of the multicast communications. The router holds a plurality of relay interfaces for one group. Fundamentally, in the multicast communications, the same packet is not relayed to the same computer and router. Therefore, the receiving interface of a router is always a 1-interface. However, the above fact is not true for the route solution stage in the routing protocol.

In the multicast communications shown in FIG. 1, each router received a packet addressed to a multicast group does not relay the packet to a link 158 between the routers R1 and R4, a link 159 between the routers R4 and R3, a link 160 between the routers R2 and R3, a link 161 between the routers R6 and R9, and a link 162 between the routers R8 and R9 all of which are the redundant routes of the multicast communications. In addition, when the source side of data is referred to as an upstream side and the destination side of data is referred to as a downstream side, the router R7, for example, does not need to relay the packet to a path 163 on the upstream side since the router R2 located on the upstream side relays the packet to the computer 151 connected to the router R2, but it may relay the packet only to links 164 and 165 on the downstream side.

FIG. 2 is a diagram showing one example of a network system for the IP (Internet Protocol) multicast communications. Routers R1–R6 are routers for IP multicast. That is, the routers R1–R6 are packet repeaters for relaying IP datagram which is a communication unit packet of IP protocol. Computers 126–134 of sources S1–S9 are computers for IP multicast protocol, and are sending and receiving terminals of the IP datagram. Groups G1–G3 indicate the ranges of the IP multicast communications.

In this network system, the computes 126, 128 and 134 of sources S1, S3 and S9 belong to the group G1, the computers 128, 129, 133 and 134 of sources S3, S4, S8 and S9 to the group G2, and the computes 127, 130, 131, 132 and 133 of sources S2, S5, S6, S7 and S8 to the group G3. Therefore, the IP datagram transmitted to the group G1 is relayed to the computers 126, 128 and 134 of sources S1, S3 and S9, the IP data gram transmitted to the group G2 is relayed to the computers 128, 129, 133 and 134 of sources S3, S4, S8 and S9, and the IP datagram transmitted to the group G3 is relayed to the computers 127, 130, 131, 132 and 133 of sources S2, S5, S6, S7 and S8. The router R1 at the center of the diagram has an interface "a" connected to the router R2, an interface "b" connected to the router R6, an interface "c" connected to the router R4, an interface "d" connected to the computer 128 of source S3, an interface "e" connected to the computer 129 of source S4, and an interface "f" connected to the router R5.

The multicast communications routing system includes a system in which the user previously sets the multicast communication routing information in each router, and a system in which the multicast communications routing information is transmitted and received between the routers according to the routing protocol to automatically calculate a multicast communications route. Here, as the multicast routing protocol, there are a routing protocol X and a routing protocol Y which will be described below. The routing protocol X is the routing protocol of the broadcast and prune system, and there is DVMRP (RFC1075) as a typical example. The routing protocol Y is the routing protocol of the explicit join system, and there is PIM-SM (RFC2117) as a typical example.

FIGS. 3A and 3B are diagrams for explaining the operation of the routing protocol X. According to the routing protocol X, when a router R10 receives IP datagram 170 from a computer 176 of source S1, it relays the IP datagram 170 to routers R20, R30, R40 on the downstream side (see IP datagram 171–173). The router R20 received the IP datagram 171 relays it to a computer 177 since the router R20 is connected to the computer 177 belonging to the destination group G1 of the IP datagram 171. The router R30 received the IP datagram 172 also repays it to a computer 178 since the router R30 is connected to the computer 178 belonging to the destination group G1 of the IP datagram 172. However, the router R40 received the IP datagram 173 transmits a prune request 175, which rejecting the relaying of IP datagram of the source address S1 and the destination group G1, to the router R10 which relayed the IP datagram 173, since the connected computer 179 does not belong to the destination group G1 of the IP datagram 173. Then, as shown in FIG. 3B, the IP router R10 received the prune request 175 receives IP datagram 180 having the rejected source address S1 and destination group G1, but does not relay the IP datagram 180 to the router R40 which transmitted the prune request 175.

FIGS. 4A and 4B are diagrams for explaining the operation of the routing protocol Y. According to the routing protocol Y, as illustrated in FIG. 4A, computers 190 and 191 which desire to relay IP datagram of a destination group G1 issue join requests 194 and 195, which include a group information (G1), to routers R21 and R31 on the upstream side, respectively. The routers R21 and R31 register interfaces 204 and 205 which received the join requests 194 and 195, and the group information (G1) included in the join requests 194 and 197. Also, the routers R21 and R31 issue the join requests 196 and 197, which include the group information (G1), to the router R11 on the upstream side. The router R11 registers interfaces 201 and 202 which received the join requests 196 and 197, and the group information (G1) included in the join requests 196 and 197. Then, as shown in FIG. 4B, when the router R11 receives IP datagram 200 of the destination group G1 coincident with the registered group information (G1) from the computer 193 of source S1, it relays the IP datagram 200 only to the routers R21 and R31 connected to the interfaces 201 and 202 which received the join requests 196 and 197. The routers R21 and R31 operate as does the router R11. Thus, the IP datagram 200 is transmitted to the computers 190 and 191 which issued the join requests 194 and 195, but is not transmitted to the computer 192 which did not issue the joint request.

FIG. 5 is a diagram showing one example of the header format of IP datagram. In the multicast communications, a source address (SX) is stored in a source address field 210 of the IP datagram header, and a multicast destination group address (GX) is stored in a destination address field 211 of the IP datagram header. The destination group address (GX) is of class D in order to coexist with or be distinguished from the existing IP destination address (of classes A–C). FIG. 6 shows the class-D address format. The first four bits "1110" in FIG. 6 means the class D. By the way, the class A is indicated by the first one bit of "0", the class B by the second two bits of "10", and the class C by the first three bits of "110".

A conventional packet switching apparatus capable of being used as the router R1 in the multicast network system shown in FIG. 2 will be described with reference to FIGS. 7–9.

FIG. 7 is a block diagram of a packet switching apparatus in which a forwarding unit 235 and a routing unit 236 shown in FIG. 9 are constructed by using separate processors 245 and 246. In this packet switching apparatus, the routing unit 236 includes the processor 245 and a memory 240, and the forwarding unit 235 includes the processor 246, a memory 241, a comparator 243 and six interfaces "a"–"f". Here, the comparator 243 compares the contents of a table stored in the memory 241 with a specified pattern. If the processor 246 is adapted to execute the function of the comparator 243, the comparator 243 can be omitted. In addition, the processors 245 and 246 may be constructed to execute the programs stored in the memories 240 and 241 or to operate according to hardware logic.

FIG. 8 is a block diagram of a packet switching apparatus in which the forwarding unit 235 and routing unit 236 shown in FIG. 9 are constructed by using the same processor 247. In this packet switching apparatus, the routing unit 236 and the forwarding unit 235 include the processor 247, a memory 242, a comparator 244 and six interfaces "a"–"f". Here, the comparator 244 compares the contents of a table stored in the memory 242 with a specified pattern. If the processor 247 is adapted to execute the function of the comparator 244, the comparator 244 can be omitted. In addition, the processor 247 may be constructed to execute the program stored in the memory 242 or to operate according to hardware logic.

The switching system concept of the conventional packet switching apparatus capable of being used as the router R1 in the multicast network system shown in FIG. 2 will be described with reference to FIG. 9.

The packet switching apparatus (router R1) has one or more physical or logic interfaces (interfaces "a"–"f"), and can be divided roughly into two blocks, or the forwarding unit 235 and the routing unit 236.

The forwarding unit 235 has a routing information table 234 for routing a particular packet. The forwarding unit 235 compares the address information (source address S1 and destination group address G1) of a packet 227 received from one interface "a" with the contents of the address section of the routing information table 234. If both are coincident at an entry on the routing information table 234, the switching operation is performed according to the contents of the corresponding outgoing interface (OUT i/f) section of the entry. On the routing information table 234, there is registered the results (information composed of the address section, receiving interface (IN i/f) section and outgoing interface section) of the received packet rout-calculated by the routing unit 236. The routing information table 234 is stored in the memory 241 of the hardware construction shown in FIG. 7, or in the memory 242 of the hardware construction shown in FIG. 8. In addition, the address information of the received packet 227 is compared with the contents of the address section of the routing information table 234 by the comparator 243 of the hardware structure shown in FIG. 7 or by the comparator 244 of the hardware construction shown in FIG. 8.

The routing unit 236 has a parts-of-routing-information table 220 which includes a source information 240 for confirming whether or not the source information is received from a correct interface and a destination information 241 indicating a relayed terminal with the destination. In the receiving interface section of the source information 240, the interfaces most suitable for the source registered in the source section are registered. The group addresses are registered in the address group section of the destination information 241 on the parts-of-routing-information table 220, and a plurality of interfaces most suitable for relaying to the destination groups are registered in the outgoing interface section thereof. The parts-of-routing-information table 220 is sometimes set by the user or between the apparatuses by the routing protocol or the like as described above. The parts-of-routing-information table 220 is stored in the memory 240 of the hardware structure shown in FIG. 7, or in the memory 242 of the hardware construction shown in FIG. 8.

In the packet switching apparatus of this structure, when the forwarding unit 235 receives through the interface "a" a packet 232 which has an address information (source address S1 and destination group address G1) not registered in the routing information table 234, the received packet 232 is registered in a routing queue 237. Thereafter, the forwarding unit 235 supplies to the routing unit 236 a no-matching-information of destination address 233 which is composed of the address information (source address S1 and destination group address G1) of the received packet 232 and the receiving interface information (interface "a").

When the routing unit 236 receives the no-matching-information of destination address 233 from the forwarding unit 235, it calculates the confirmation of the reception route correction and the destination on the basis of the no-matching-information of destination address 233. Specifically, the destination group address G1 included in the no-matching-information of destination address 233 and the destination information 241 of the parts-of-routing-information table 220 are compared for each entry. If the content of the destination group section is coincident with the destination group address G1, the interfaces "a", "b", "c", "d" and "f" registered in the outgoing interface section at the corresponding entry (the top entry as illustrated) are taken out. Then, the source address S1 included in the no-matching-information of destination address 233 is compared with the contents of the source information 240 of the parts-of-routing-information table 220 for each entry. If the content of the source section coincides with the source address S1, the interface "a" registered in the receiving interface section at the corresponding entry (the top entry as illustrated) is taken out. Thereafter, of the interfaces "a", "b", "c", "d" and "f" taken out from the destination information 241, the interface "a" taken out from the source information 240 is deleted to produce a routing information entry additional request 238. The routing information entry additional request 238 is sent from the routing unit 236 to the forwarding unit 235.

The forwarding unit 235 stores the received routing information entry additional request 238 in the routing information table 234. In addition, the forwarding unit 235 relays the packet, which has the source address and destination group address coincident with the address section 239 (source address S1 and destination group address G1) of the routing information entry additional request 238, of the packets registered in the routing queue 237 to the interfaces "b", "c", "d" and "f" according to the contents of the outgoing interface section of the routing information entry additional request 238 (see packets 228–231). Then, when the packet having the same source address and destination group address arrives, the forwarding unit 235 relays the packet according to the routing information table 234 added the routing information entry additional request 238.

If a new routing information cannot be produced while the routing unit 236 is calculating a route on the basis of the no-matching-information of destination address 233 received from the forwarding unit 235, the routing unit 236 sends information of being not able to produce a routing information (not shown) to the forwarding unit 235. When the forwarding unit 235 receives this information, it deletes the packet specified by the information from the routing queue 237.

Although not shown, the routing unit 236 manages the routing information table 234 of the forwarding unit 235, and orders the forwarding unit 235 to update the routing information table 234 according to the status change in the network or the like.

In the packet switching apparatus shown in FIG. 9, when a packet the destination of which is not registered in the routing information table of the forwarding unit is received, the forwarding unit registers the received packet in the routing queue, and then reports the no-matching-information of destination address to the routing unit. Thereafter, the forwarding unit waits for a new routing information or information of being not able to produce a routing information from the routing unit, and relays or deletes the received packet. As a result, there is a problem that the transmission delay occurs in the relaying of packet. In addition, there is a problem that the overflow is caused at the time of congestion because the routing queue is limited, so that the packet to be relayed is discarded. When the routing unit receives the no-matching-information of destination address from the forwarding unit, it calculates a route one by one. Consequently, when a new routing information cannot be produced, there is a problem that the routing unit makes the redundant calculation of route for the packet which cannot be relayed originally.

SUMMARY OF THE INVENTION

It is an object of the present invention to provide a packet switching method and apparatus capable of preventing from or reducing the generation of the transmission delay of the forwarding packet because the forwarding unit waits for distribution of a routing information from the routing unit, the throwing away of packet due to the overflow in the routing queue and the redundant calculation of route in the routing unit for the packet that cannot be repeated originally.

In order to achieve the above object, according to the present invention, the order of processing of route calculation and packet relaying is changed, so that the relaying route is determined on the basis of a parts-of-route-information before the route calculation. Then, after relaying the packet, the route calculation is performed to produce a routing information. The succeeding packets of the same source and destination are transmitted according to the produced routing information.

The routing unit previously distributes to the forwarding unit a parts-of-route-information set by the user or a parts-of-route-information produced on the basis of a route information collected by the communications between the neighboring packet switching apparatuses or between computers. When the forwarding unit receives a packet the destination of which does not exist in the routing information, it utilizes the parts-of-route-information previously distributed from the routing unit to calculate a route, and sends or discards the packet without storing in the routing queue. At the same time, the forwarding unit reports to the routing unit a no-matching-information of destination address that includes the received packet information the destination address of which does not exist in the routing information. The routing unit regularly produces a new routing information on the basis of the kept parts-of-route-information, and the received packet information of the no-matching-information of destination address from the forwarding unit, and distributes it to the forwarding unit. The next incoming packet of the same destination is relayed by the forwarding unit according to the routing information distributed from the routing unit.

Thus, when a packet the destination of which is not registered in the routing information is received, there are no delay of packet transmission due to the route calculation and no discard of packet due to the overflow in the routing queue. In addition, since the packet which cannot be relayed is discarded in the forwarding unit, the no-matching-information of destination address is not needed to report to the routing unit, and thus the redundant processing in the routing unit can be prevented from occurring.

Since the forwarding unit reports the no-matching-information of destination address to the routing unit and the routing unit regularly produces the routing information and distributes it to the forwarding unit, it is sure that the routing information managed by the routing unit coincides with that of the forwarding unit.

DETAILED DESCRIPTION OF THE EMBODIMENTS

An embodiment of the present invention will be described with reference to the accompanying drawings.

Figure 10:
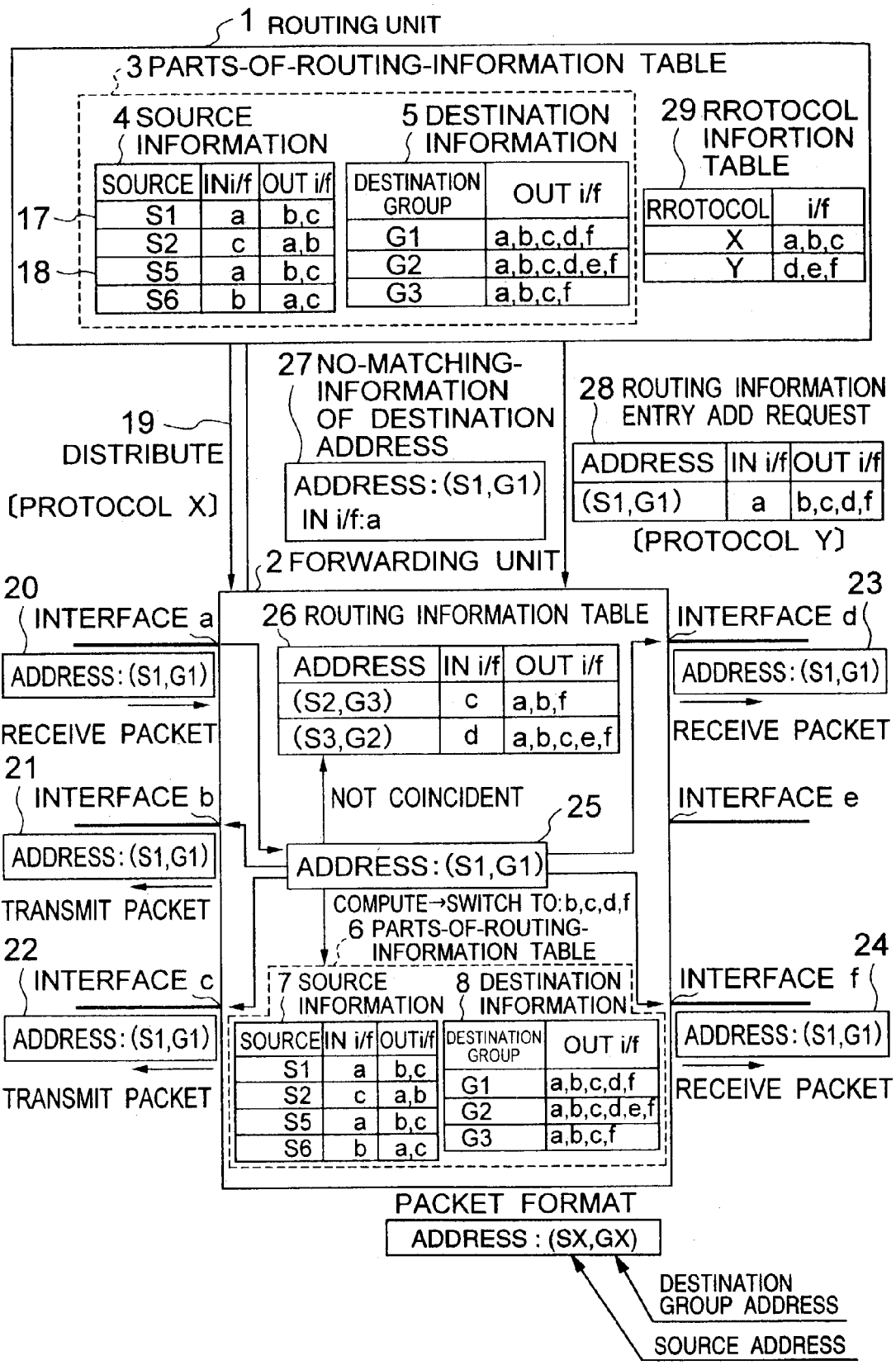
FIG. 10 is a functional block diagram of one embodiment of a packet switching apparatus according to the present invention.

FIG. 10 is a functional block diagram of one embodiment of a packet switching apparatus according to the present invention. The packet switching apparatus of this embodiment can be constructed by the same hardware structure as the conventional one shown in FIGS. 7 and 8. The packet switching apparatus has six interfaces "a"–"f", and can be divided roughly into two blocks, or a routing unit 1 for computing a route for packets, and a forwarding unit 2 for relaying packets. Although the routing unit 1 and the forwarding unit 2 are desired to be respectively formed by different processors in order for the route computation and the relaying process to be performed at the same time, they may be constructed by different task modules of a single processor (see FIGS. 7 and 8).

The routing unit 1 updates a parts-of-routing-information table 3 on the basis of which a route is calculated, produces and manages a routing information table in which routes for particular packets resulting from computing by referring to the parts-of-routing-information table 3 are stored, and registers and updates a routing information table 26 and parts-of-routing-information table 6 in the forwarding unit 2. In this embodiment, the parts-of-routing-information table 3 of the routing unit 1 includes a source information 4 for use in checking if the reception route of the received packet within this network system is correct, and a destination information 5 indicating the destination of the received packet. A protocol information table 29 of the routing unit 1 will be mentioned later. The parts-of-routing-information table 3 and the protocol information table 29 are stored in the memory 240 in the hardware structure shown in FIG. 7 or in the memory 242 in the hardware structure shown in FIG. 8.

The forwarding unit 2 relays the received packet according to the routing information table 26. If the routing information table 26 does not have an entry coincident with the source information (source address) and destination information (destination group address) of the received packet, the forwarding unit 2 calculates a route by referring to the parts-of-routing-information table 6 previously distributed from the routing unit 1, and relays the received packet. Then, the forwarding unit 2 reports to the routing unit 1 that it has relayed the packet not present in the routing information table 26, as a no-matching-information of destination address 27. When the routing unit 1 issues to the forwarding unit 2 a routing information entry additional request 28 that is produced by computing from the no-matching-information of destination address 27 and parts-of-routing-information table 3, the forwarding unit 2 receives the routing information entry additional request 28 and adds a new entry to the routing information table 26. The routing information table 26 and the parts-of-routing-information table 6 are stored in the memory 241 in the hardware structure shown in FIG. 7 or in the memory 242 in the hardware structure shown in FIG. 8.

Figure 11:
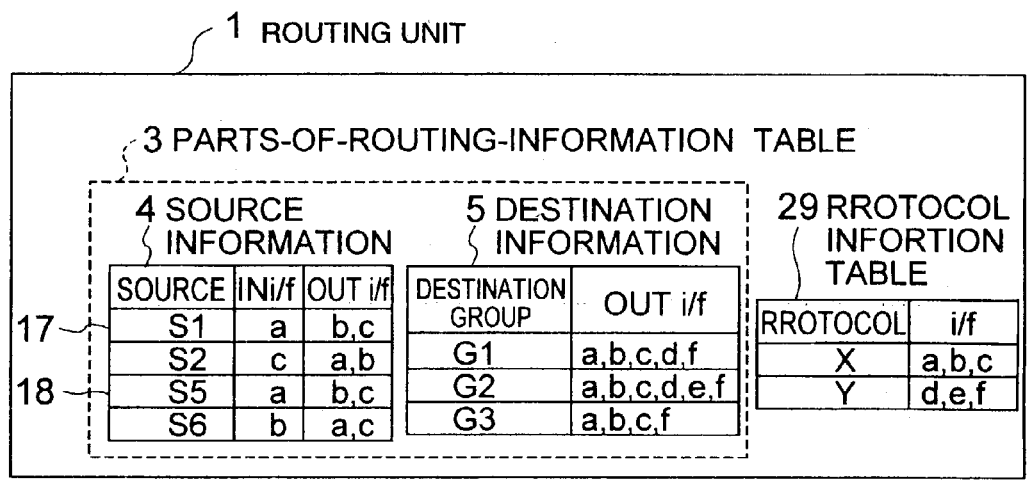
FIG. 11 is a diagram showing packet switching due to a routing information in the embodiment of the packet switching apparatus according to the present invention.
Figure 11:
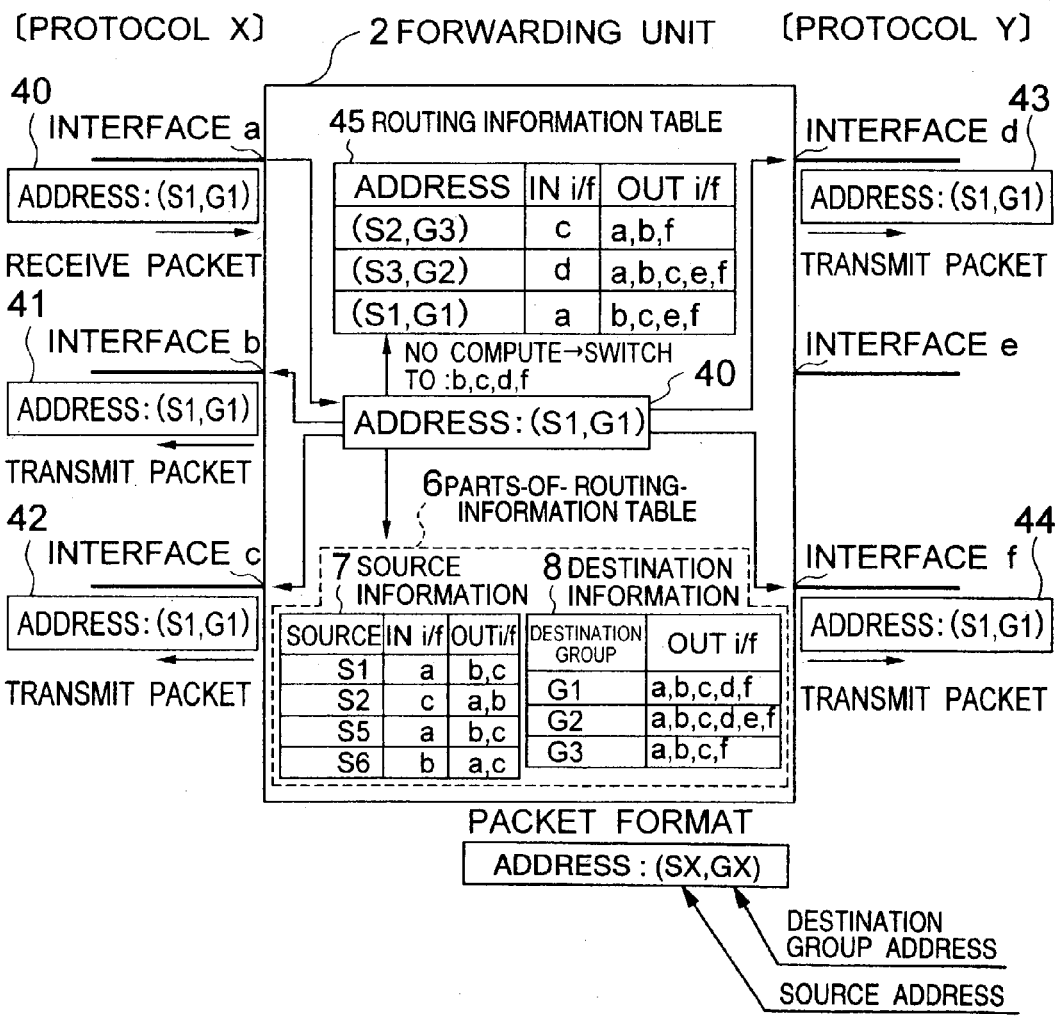

When the succeeding packets of the same destination are received, the forwarding unit 2 relays the received packets according to the routing information table 26 with the new entry added (see FIG. 11). In addition, when a route cannot be decided even by referring to the parts-of-routing-information table 6, the forwarding unit 2 discards the received packet (see FIG. 12).

The information for referring to the routing information table 26 and parts-of-routing-information tables 3 and 6 includes the source information 4 and 7 and the destination information 5 and 8. The routing unit 1 and the forwarding unit 2 compare these information with the source information (source address) and destination information (destination group address) of the received packet to perform the route computation.

The routing information table 26 and the parts-of-routing-information tables 3 and 6 are capable of registering one or more outgoing interfaces to one receiving interface entry of the source information. The forwarding unit 2 receives one packet through one receiving interface, and it copies and transmits the received packet into a plurality of different outgoing interfaces to achieve the multicast transmission.

The operation of the packet switching apparatus of this embodiment will be described as one example in case that it is used as the router R1 shown in FIG. 2.

Figure 1:
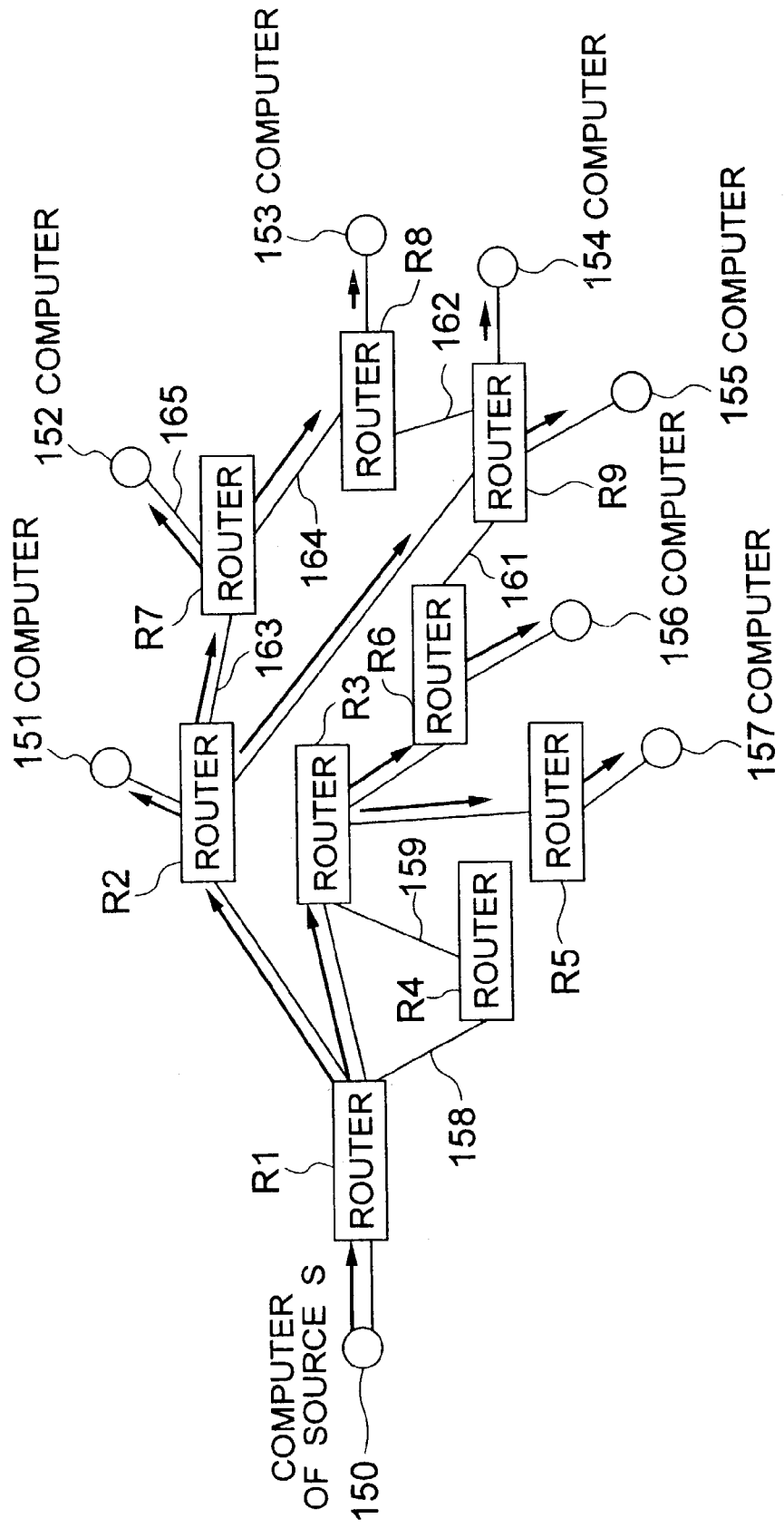
FIG. 1 is a conceptual diagram of the multicast communications.
Figure 2:
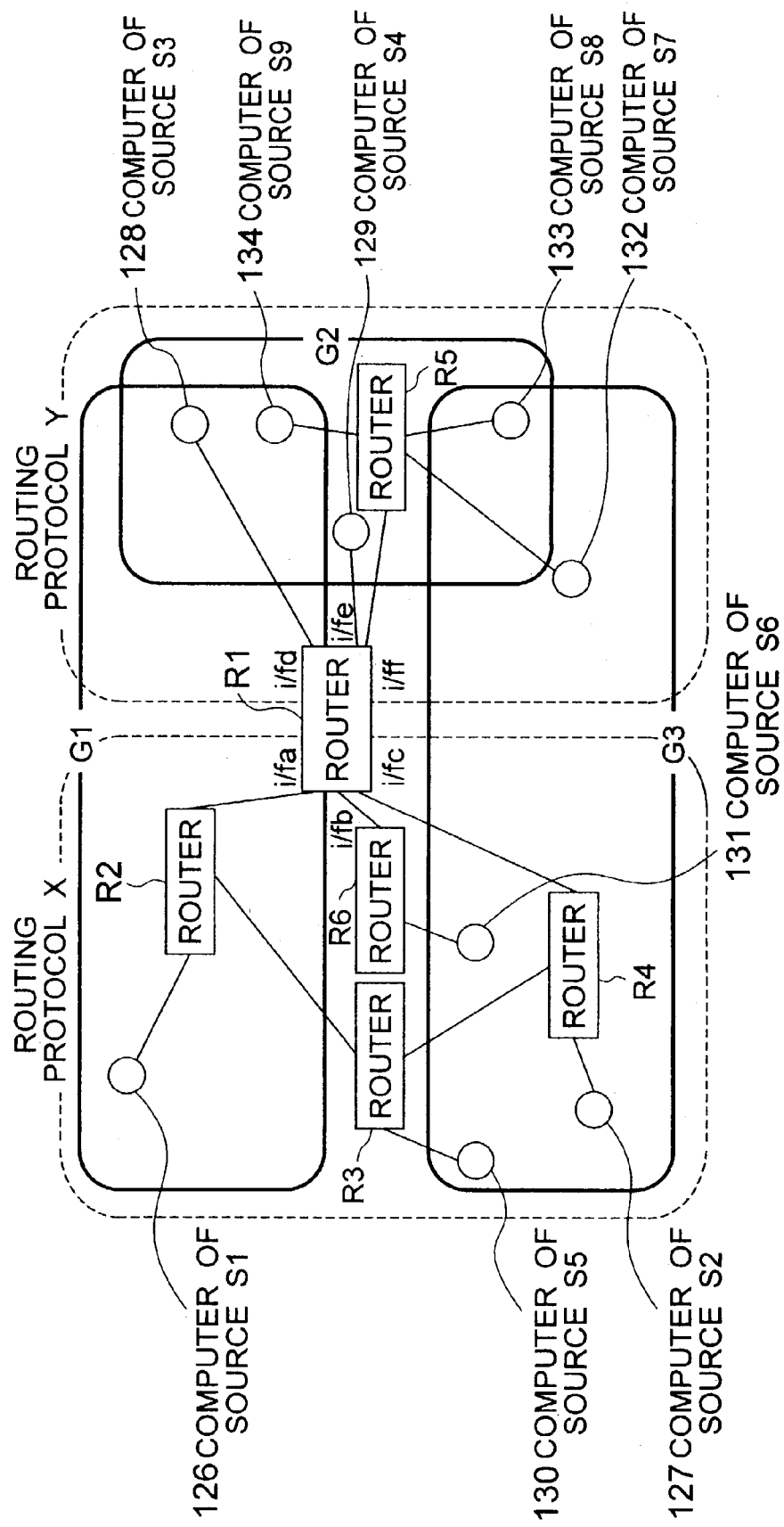
FIG. 2 is a diagram showing one example of an IP multicast communications network.
Figure 3A:
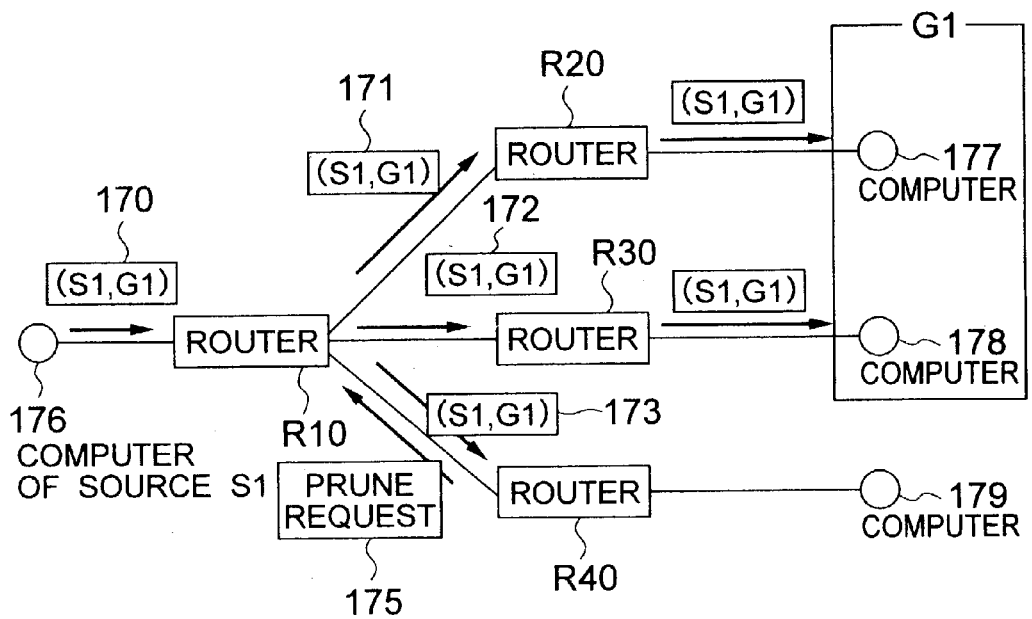
FIGS. 3A and 3B are diagrams showing the operation of the routing protocol X.
Figure 3B:
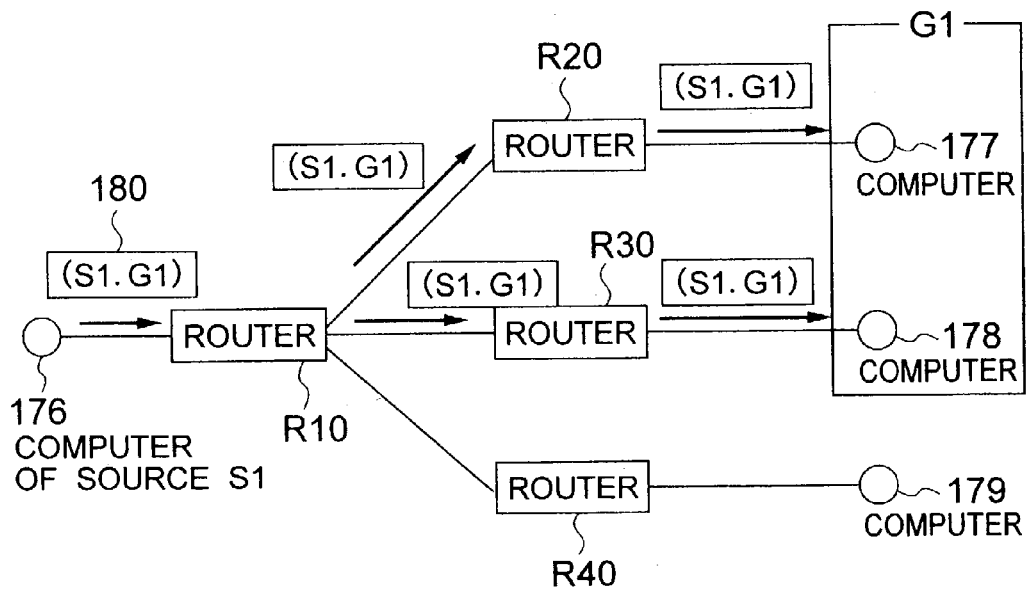
Figure 4A:
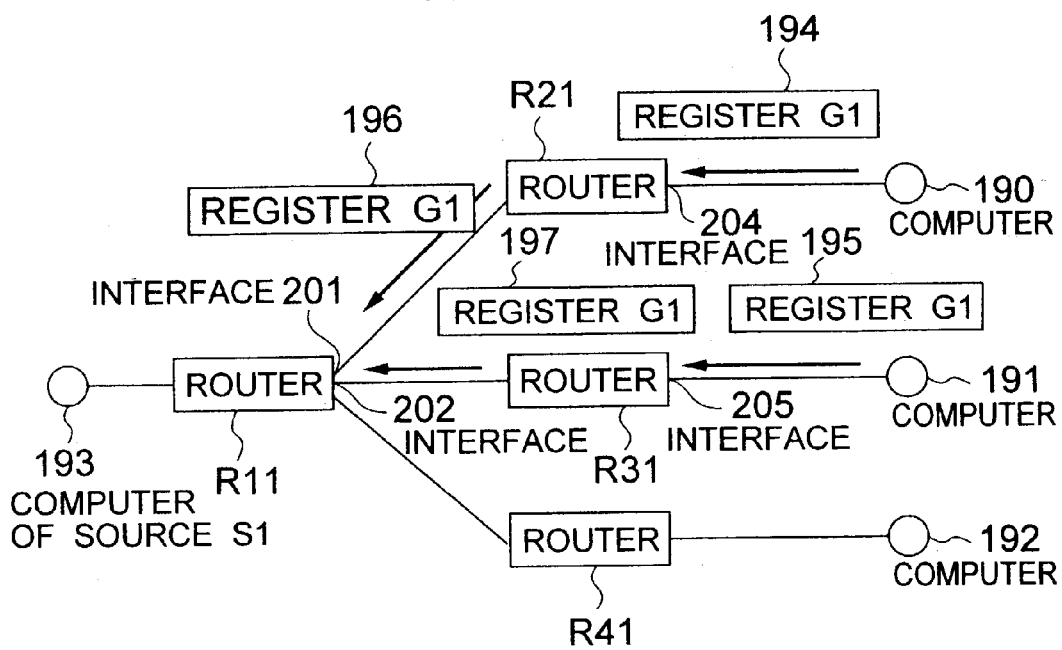
FIGS. 4A and 4B are diagrams showing the operation of the routing protocol Y.
Figure 4B:
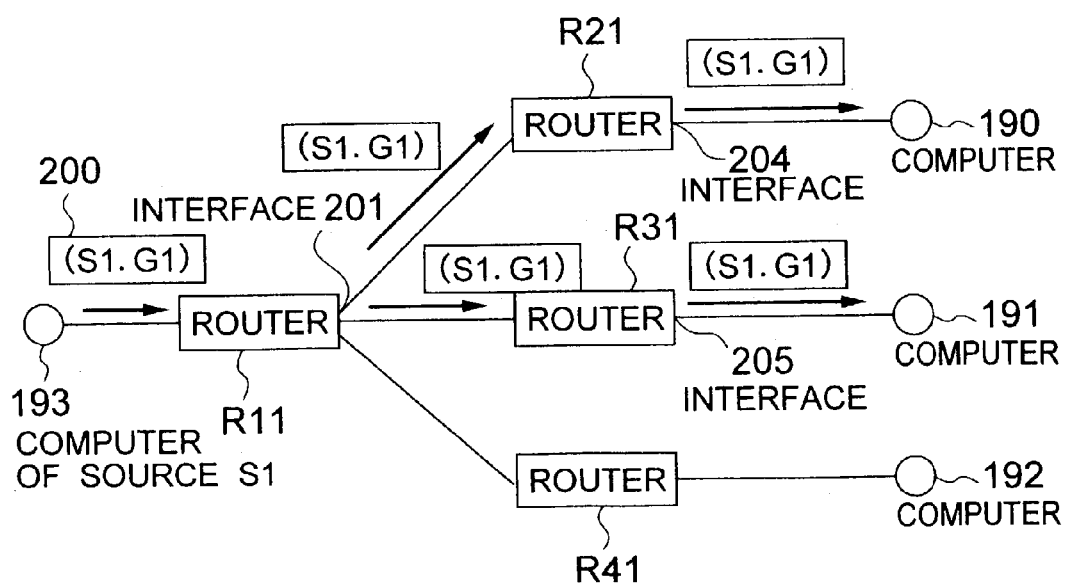
Figures 5, 6:
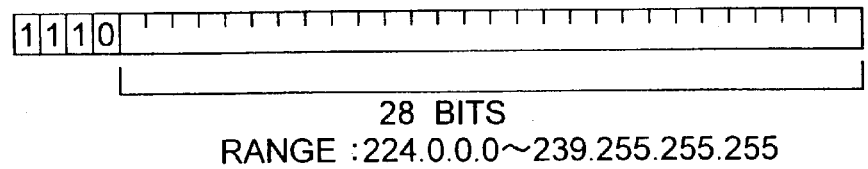
FIG. 5 is a diagram showing one example of the IP datagram header format.
FIG. 6 is a diagram showing the multicast group address format.

In the network system shown in FIG. 2, the router R1 operates according to the routing protocol X for the interfaces "a", "b" and "c", and operates according to the routing protocol Y for the interfaces "d", "e" and "f". These two routing protocols X and Y are different, but the computers within the same group are required to be able to communicate with each other.

When the packet switching apparatus of this embodiment shown in FIG. 10 is operated as the router R1 shown in FIG. 2, the packet switching apparatus operates according to the routing protocol X for the network on the interfaces "a", "b" and "c" side, but operates according to the routing protocol Y for the network on the interfaces "d", "e" and "f" side. The routing unit 1 manages the protocol information for each interface as a protocol information table 29.

The routing unit 1 exchanges information with the routing units of the neighboring IP routers according to the routing protocol to collect the parts-of-routing-information (source information 4 and destination information 5) to be registered in the parts-of-routing-information table 3. At this time, the network information may be inputted in a form of fixed values by the user without using the routing protocol.

The routing unit 1 registers an interface nearest to the network at the source information 4 in the parts-of-routing-information table 3. In the network system shown in FIG. 2, the route from the computer 126 of source S1 to the router R1 can be treated by the interfaces "a" and "c". In this case, the interface "a" treats a one-stage route through the router R2, but the interface "c" treats a three-stage route through the routers R2, R3 and R4. Therefore, as shown in FIG. 10, at an entry 17 where the source section of the source information 4 is the source S1, the interface "a" is registered at the receiving interface (IN i/f) section, and the interfaces "b" and "c" of all interfaces "a", "b" and "c" operated according to the routing protocol X are registered at the outgoing interface (OUT i/f) section. In addition, as the computer 130 of source S5 shown in FIG. 2, when the distances from the interfaces "a" and "c" to the computer 130 are equal since both are a two-stage route, either one is selected according to the address or other information relative to the router R1. Here, assuming that the IP address of the interface of the router R2 connected to the interface "a"

of the router R1 is smaller than the IP address of the interface of the router R4 connected to the interface "c" of the router R1, the smaller IP address (i.e. router R2) is selected. Therefore, as shown in FIG. 10, the interface "a" is registered in the receiving interface section of source S5 at an entry 18 of the source information 4, and the interfaces "b" and "c" in the outgoing interface section at the entry 18.

Thus, in order that the computers within the same group in the network of the routing protocol X and in the network of the routing protocol Y can be communicated with each other, the IP datagram received through the interface of the network of the routing protocol Y must be relayed to all the interfaces "a", "b" and "c" of the network of the routing protocol X. Therefore, all the interfaces "a", "b" and "c" operated according to the routing protocol X are taken out from the entry at which the content of the protocol section in the protocol information table 29 is the routing protocol X, and are registered by being added to the outgoing interface (OUT i/f) section of the destination information 5 in the parts-of-routing-information table 3 by registering.

The routing unit 1 generates the parts-of-routing-information table 3 from the collected source information 4 and the destination information 5 to distribute it to the forwarding unit 2 (arrow 19). At this time, the parts-of-routing-information table 3 of the routing unit 1 is equal to the parts-of-routing-information table 6 of the forwarding unit 2. The packet received before the distribution is discarded as a packet having no destination.

When the parts-of-routing-information table 3 is changed because of the route pruning by the routing protocol X, finding of a new transmission source, a group registration request of the routing protocol Y and so forth, the routing unit 1 redistributes the parts-of-routing-information table 3 to the forwarding unit 2 (arrow 19). Thus, the parts-of-routing-information table 3 of the routing unit 1 and the parts-of-routing-information table 6 of the forwarding unit 2 are kept equal.

Figure 13:
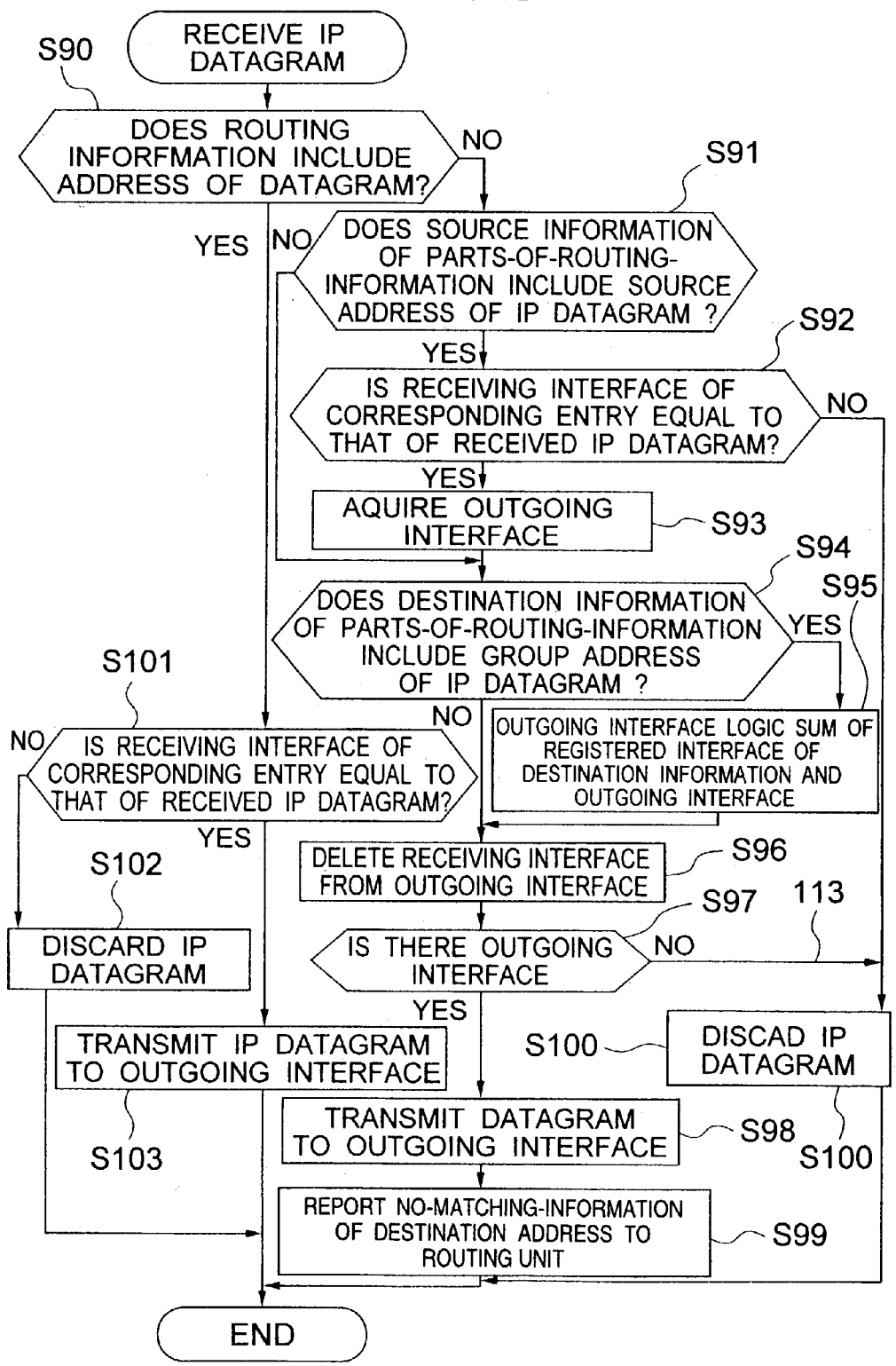
FIG. 13 is a flowchart for the operation of a forwarding unit in the embodiment of the packet switching apparatus according to the present invention.

FIG. 13 is a flowchart showing the operation when the forwarding unit 2 receives the IP datagram. The operation of the forwarding unit 2 will be described in detail with reference to FIGS. 8–11.

First, a description will be made of the case where the forwarding unit 2 receives IP datagram 25, which includes the source address S1 indicating the source and the destination group address G1 indicating the destination group in the IP header, through the interface "a" as shown in FIG. 10.

The source address S1 and destination group address G1 of the received IP datagram 25 are compared for each entry with the contents of the address section in the routing information table 26 of the forwarding unit 2 (step S90). In the routing information table 26, there are only the entries at which the contents of the address section are (S2, G3) and (S3, G2), but there is no entry at which the content of the address section is coincident with the source address S1 and destination group address G1 of the IP data gram 25. Therefore, in this case, the source address S1 of the IP datagram 25 is compared for each entry with the contents of the source section of the source information 7 in the parts-of-routing-information table 6 (step S91). Since the content (source S1) of the source section at the top entry of the source information 7 coincides with the source address S1 of the IP datagram 25, the content (interface "a") of the receiving interface at this entry is compared with the receiving interface (interface "a") of the IP datagram 25 (step S92). Since both are coincident, the contents (interfaces "b" and "c") of the outgoing interface section at this entry are taken out (step S93).

Then, the destination group address G1 of the IP datagram 25 is compared for each entry with the contents of the destination group section of the destination information 8 in the parts-of-routing-information table 6 (step S94). Since the content (group G1) of the destination group section of the destination information 8 at the top entry coincides with the destination group address G1 of the IP datagram 25, the contents (interfaces "a", "b", "c", "d" and "f") of the outgoing interface section at this entry are taken out. The taken-out contents (interfaces "a", "b", "c", "d" and "f") of the outgoing interface section and the contents (interfaces "b" and "c") of the outgoing interface section of the source information 7 taken out at step S93 are logically summed to be new outgoing interfaces (interfaces "a", "b", "c", "d" and "f") (step S95). The interface "a" which is the receiving interface of the IP datagram 25 is removed from the new outgoing interfaces (interfaces "a", "b", "c", "d" and "f") to determine the final outgoing interfaces (interfaces "b", "c", "d" and "f") (step S96).

At step S91 where the source address S1 of the IP datagram 25 is compared with the contents of the source section of the source information 7, if there is no entry at which both are coincident, the decision is "there is no outgoing interface", and the program skips over the steps S92 and S93. At step S94 where the destination group address G1 of the IP datagram 25 is compared with the contents of the destination group section of the destination information 8, if there is an entry at which both coincide, the contents of the outgoing interface section at this entry are taken out. The taken-out contents of the outgoing interface section and the decision of "there is no outgoing interface" are logically summed as a matter of form (step S95). Then, the receiving interface of the IP datagram is deleted (step S96). Thus, the final outgoing interface is determined. At step S94, if there is no entry at which the destination group address G1 of the IP datagram 25 is coincident with the contents of the destination group section of the destination information section 8, the decision is "there is no outgoing interface", and then the program goes to step S96.

Thereafter, the decision is made of if there is the finally decided outgoing interface (interfaces "b", "c", "d" and "f") (step S97). At this time, if there is no outgoing interface, the program goes to step S100, where the received IP datagram is discarded. If there are one or more outgoing interfaces, the received IP datagram 25 is transmitted to the outgoing interfaces (step S98). In this example, since the finally decided outgoing interfaces (interfaces "b", "c", "d" and "f") are all present, the received IP datagram 25 is copied, and then fed to the interfaces "b", "c", "d" and "f" (see IP datagram 21–24 in FIG. 10). At this time, the IP header of the IP datagram is sometimes changed according to the information of each interface such as TTL.

Then, the forwarding unit 2 transmits to the routing unit 1 the no-matching-information of destination address 27 which is formed of the source address S1 and destination group address G1 of the received IP datagram 25 and the receiving interface (interface "a"), in order to report to the routing unit 1 that at step S90 the routing information table 26 is decided to have no entry where the contents of the address section coincide with the source address S1 and destination group address G1 of the IP datagram 25 (step S99).

Figure 7:
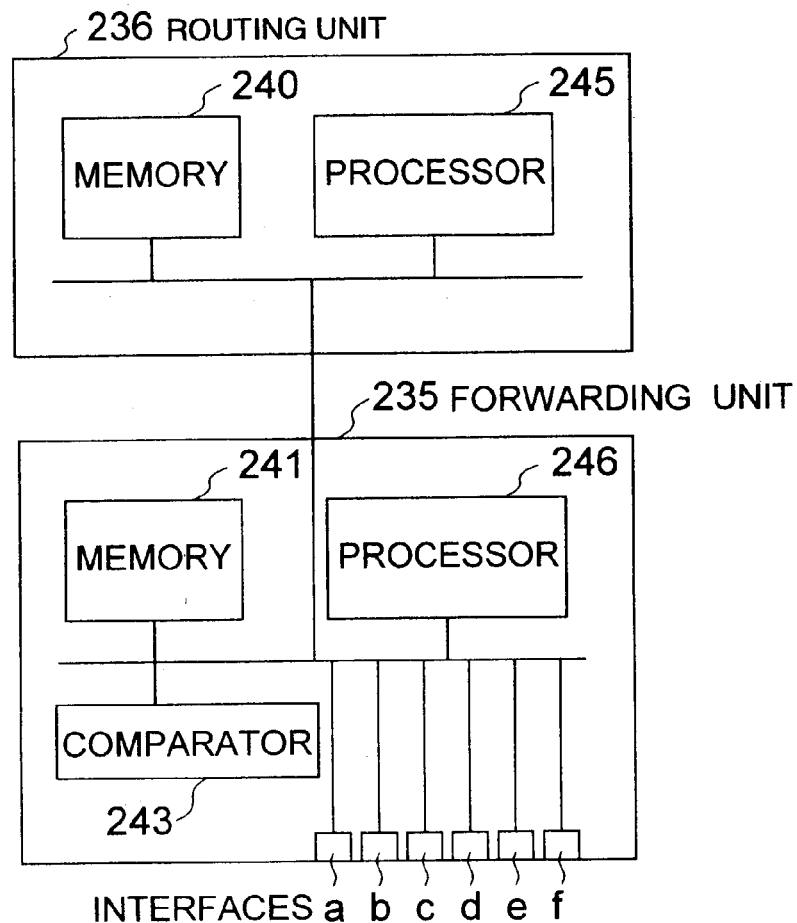
FIG. 7 is a block diagram of one example of the hardware structure of a conventional packet switching apparatus for the multicast communications.
Figure 8:
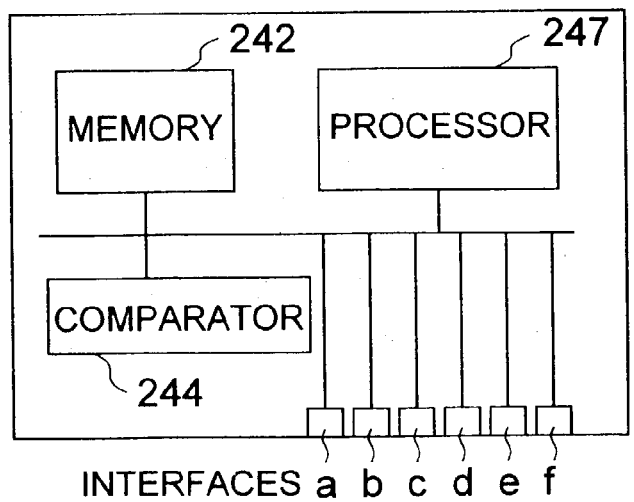
FIG. 8 is a block diagram of another example of the hardware structure of a conventional packet switching apparatus for the multicast communications.

In the operation of the forwarding unit 2 mentioned above, the comparison at steps S90 and S91 for example is performed by the comparator 243 in the hardware structure shown in FIG. 7 or by the comparator 244 in the hardware structure shown in FIG. 8.

The routing unit 1 compares the source address S1 of the received no-matching-information of destination address 27 with the contents of each entry of the source section of the source information 4 in the parts-of-routing-information table 3. In this case, since there is an entry at which both coincide (the top entry as illustrated), the content (interface "a") of the receiving interface section at this entry is compared with the receiving interface (interface "a") of the parts-of-routing-information table 27. At this time, if both are not coincident, the parts-of-routing-information table 27 is thrown away. In this case, since both are coincident, the contents (interfaces "b" and "c") of the outgoing interface section at the above entry are taken out. In addition, the destination group address G1 of the no-matching-information of destination address 27 is compared for each entry with the contents of the destination group section of the destination information 5 in the parts-of-routing-information table 3. In this example, since there is an entry at which both are coincident (the top entry shown), the contents (interfaces "a", "b", "c", "d" and "f") of the outgoing interface section at this entry are taken out. Then, the obtained contents (interfaces "a", "b", "c", "d" and "f") of the outgoing interface section of the destination information 5 and the taken-out contents (interfaces "b" and "c") of the outgoing interface section of the source information 4 are logically summed to be new outgoing interfaces (interfaces "a", "b", "c", "d" and "f"). Thereafter, the receiving interface (interface "a") is deleted from the new outgoing interfaces (interfaces "a", "b", "c", "d" and "f"), thus the final outgoing interfaces (interfaces "b", "c", "d" and "f") being determined.

When there is not entry at which the contents of the destination group of the destination information 5 in the parts-of-routing-information table 3 are coincident with the destination group address G1 of the no-matching-information of destination address 27, the taken-out contents (interfaces "b" and "c") of the outgoing interface section of the source information 4 are decided as outgoing interfaces. In addition, when there is no entry at which the source address S1 of the no-matching-information of destination address 27 is compared with and coincides with the contents of the source section of the source information 4 in the parts-of-routing-information table 3, the group address G1 of the no-matching-information of destination address 27 is compared with the contents of the destination group section of the destination information 5 in the parts-of-routing-information table 3. If there is an entry at which both are coincident, the contents of the outgoing interface section at this entry are taken out, and logically summed with the previously taken-out contents of the outgoing interface section of the source information 4 in the parts-of-routing-information table 3, and the receiving interfaces are deleted.

Since one or more interfaces exist in the finally decided outgoing interfaces (interfaces "b", "c", "d" and "f"), the routing information entry additional request 28 is produced from the source address S1 and destination group address G1 of the no-matching-information of destination address 27, the receiving interface (interface "a") and the determined outgoing interfaces (interfaces "b", "c", "d" and "f"), and is distributed from the routing unit 1 to the forwarding unit 2. If there is no interface in the finally decided outgoing interfaces, the no-matching-information of destination address 27 is discarded.

Figure 9:
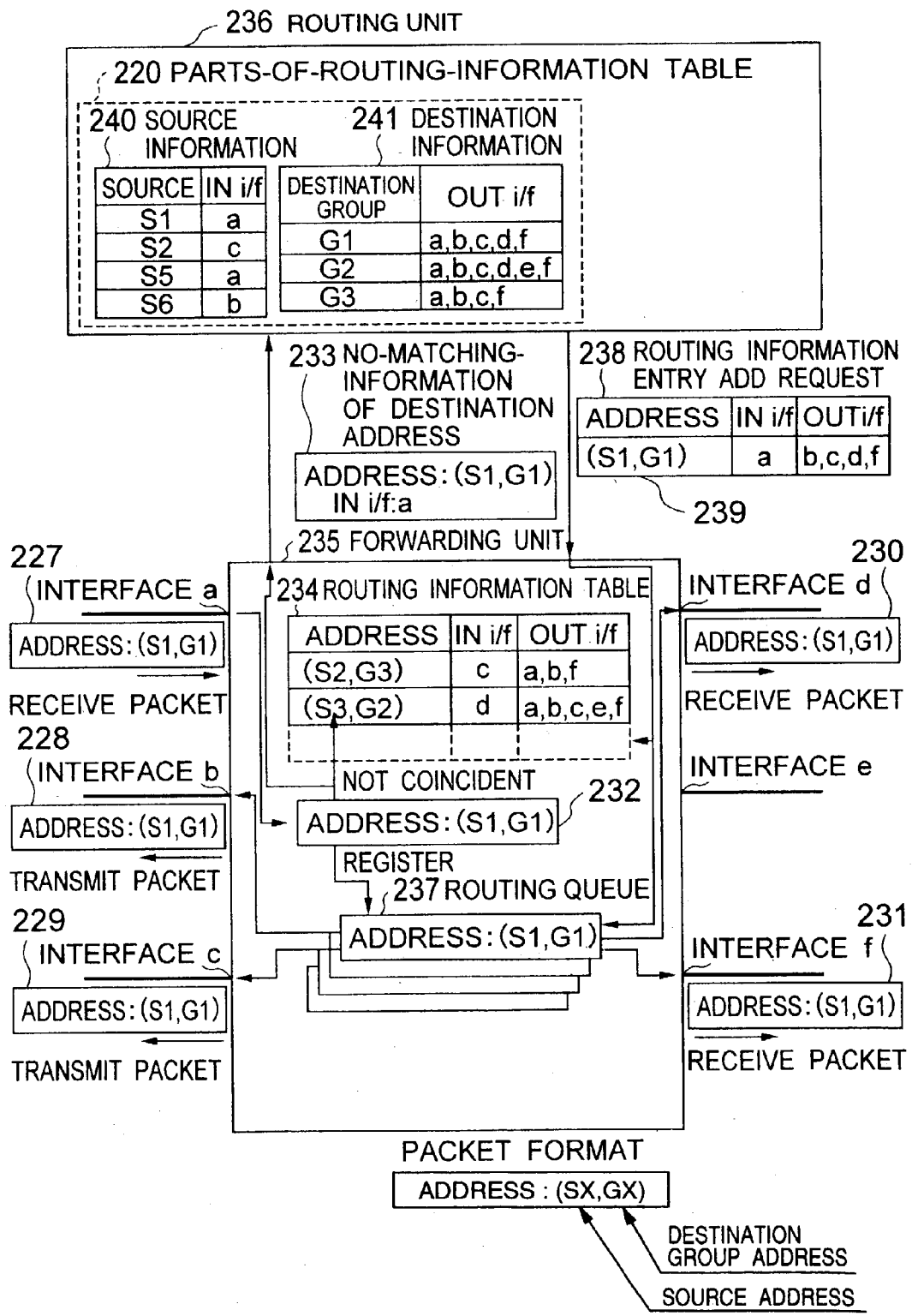
FIG. 9 is a functional block diagram of a conventional packet switching apparatus.

The forwarding unit 2 registers the routing information entry additional request 28 distributed from the routing unit 1 in the routing information table 26 (see the routing information tables 45 and 41 of the forwarding unit 2 shown in FIGS. 9 and 10).

When the routing unit 1 and the forwarding unit 2 are independently operated, all the received packets may be processed as described above before the routing information entry additional request 28 from the routing unit 1 arrives at the forwarding unit 2, and the report of the no-matching-information of destination address may be omitted.

With reference to FIGS. 11 and 13, a description will be made of the operation of the forwarding unit 2 when it receives through the interface "a" IP datagram 40 in which the IP header includes the same source address S1 and destination group address G1 as relayed in the above process.

The source address S1 and destination group address G1 of the IP datagram 40 are compared for each entry with the contents of the address section in the routing information table 45 to which the routing information entry additional request 28 is added as described above (step S90). Since the routing information table 45 has an entry (the top entry as illustrated) at which the contents of the address section are (S1, G1), it is checked if the content (interface "a") of the receiving interface section at this entry is coincident with the interface "a" through which the IP datagram 40 is received (step S101). In this case, since both are coincident, the contents (interfaces "b", "c", "d" and "f") of the outgoing interface section at this entry are taken out. Then, the received IP datagram 40 is copied, and thereafter at step S103 the IP datagram 40 is sent to the interfaces "b", "c", "d" and "f" (see IP datagram 41–44). At this time, the IP header of the IP datagram is sometimes changed according to the information of each interface such as TTL.

When at step S101 the contents of the receiving interface section at the above entry is decided not to coincide with the interface through which the IP datagram has been received, the received IP datagram is thrown away (step S102).

Figure 12:
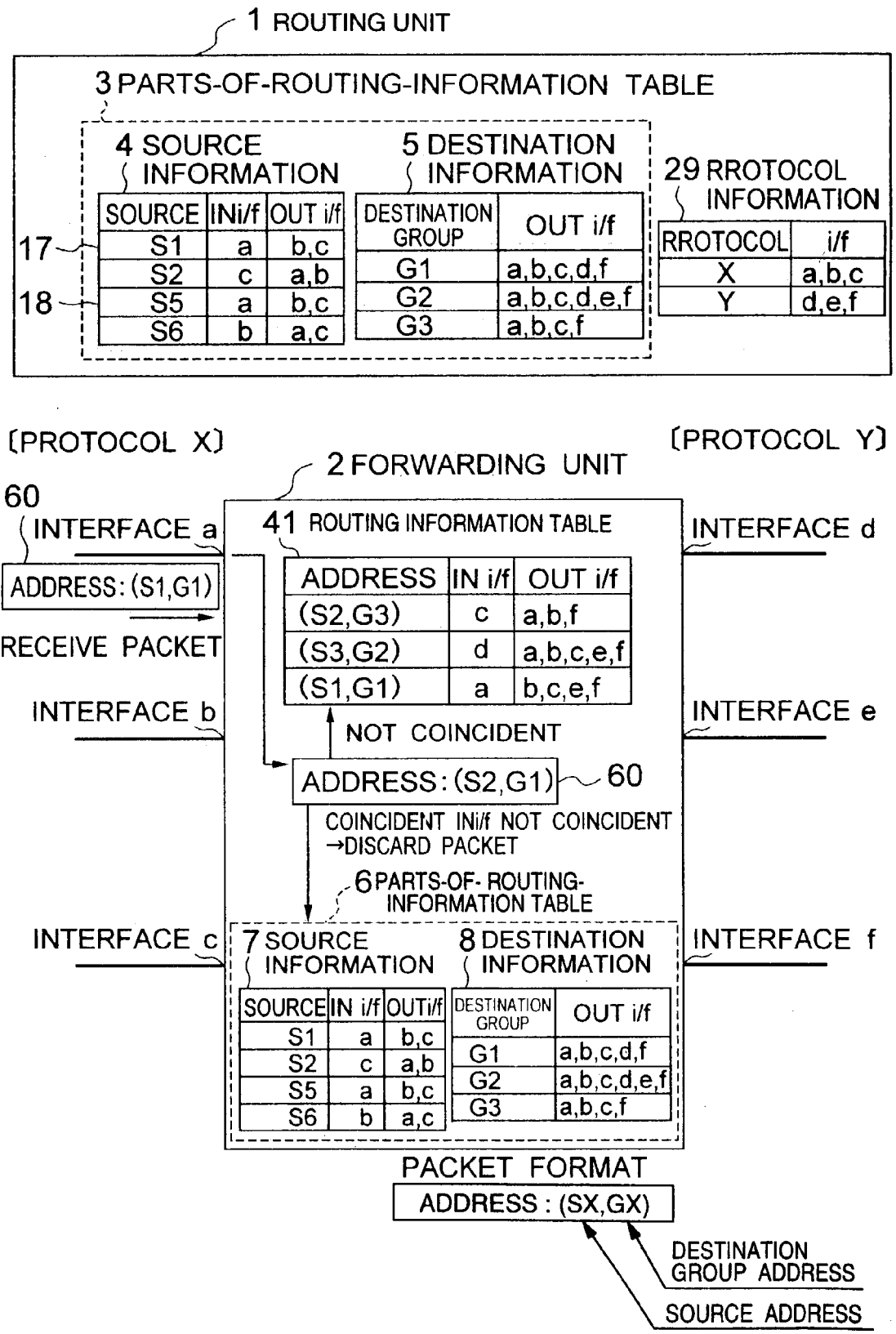
FIG. 12 is a diagram showing packet discard due to the inconsistent received interface in the embodiment of the packet switching apparatus according to the present invention.

With reference to FIGS. 12 and 13, a description will be made of the operation of the forwarding unit 2 when the forwarding unit 2 receives through the interface "a" IP datagram 60 in which the IP header includes the source address S2 different from that relayed in the process shown in FIG. 10, and the same destination group address G1 as transmitted in the process shown in FIG. 10.

The source address S2 and destination group address G1 of the IP datagram 60 are compared for each entry with the contents of the address section in the routing information table 41 of the forwarding unit 2 (step S90). In the routing information table 41, there are only the entries at which the contents of the address section are (S2, G3), (S3, G2) and (S1, G1), and there is no entry which includes the contents of address section coincident with the source address S2 and destination group address G1 of the IP datagram 60. Therefore, the program goes to step S91, where the source address S2 of the IP datagram 60 is compared for each entry with the contents of the source section of the source information 7 in the parts-of-routing-information table 6. Since the content (source S2) of the source section at the second entry from the top in the source information 7 as illustrated coincide with the source address S2 of the IP datagram 60, the content (interface "c") of the receiving interface section at this entry is compared with the receiving interface (interface "a") of the IP datagram 60 (step S92). In this case, since both are not coincident, the received IP datagram 60 is discarded (step S100).

Although the forwarding unit 2 makes comparison with the source information 7 and destination information 8 in the parts-of-routing-information table 6 as described above, it is possible to produce a packet switching apparatus in which only the source information 7 in the parts-of-routing-information table 6 is compared, and a packet switching apparatus in which only the destination information 8 in the parts-of-routing-information table 6 is compared. The packet switching apparatus in which only the source information 7 in the parts-of-routing-information table 6 is compared makes the same operation as at step S94 of FIG. 13 where the decision is "NO", and the packet switching apparatus in which only the destination information 8 in the parts-of-routing-information table 6 is compared makes the same operation as at step S91 of FIG. 13 where the decision is "NO".

While the routing unit 1 makes comparison with the source information 4 and destination information 5 in the parts-of-routing-information table 3 as described above, it is possible to produce a packet switching apparatus in which only the source information 4 in the parts-of-routing-information table 3 is compared, and a packet switching apparatus in which only the destination information 5 in the parts-of-routing-information table 3 is compared. The packet switching apparatus in which only the source information 4 in the parts-of-routing-information table 3 is compared makes the same operation as when both are not coincident in the comparison with the destination information 5 in the parts-of-routing-information table 3 in the above example. The packet switching apparatus in which only the destination information 5 in the parts-of-routing-information table 3 is compared makes the same operation as when both are not coincident in the comparison with the source information 4 in the parts-of-routing-information table 3.

Thus, in the packet switching apparatus of this embodiment, the routing unit 1 manages the routing information table 26, detects the change of situations occurring in a pair of source address and destination group address, makes the change be reflected on the routing information table 26, and distributes the table to the forwarding unit 2. These processes include the prune request by the routing protocol X, the join request by the routing protocol Y and so froth.

Also, in the packet switching apparatus of this embodiment, when the forwarding unit receives a non-registered destination IP datagram at the routing information table, the received IP datagram is relayed to the most suitable interface, and then reports the fact of inconsistency to the routing unit 1. The routing unit received this report distributes the routing information entry additional request 28 to the forwarding unit 2. The forwarding unit 2 adds the distributed routing information entry additional request 28 to the routing information table 26.

This routing information entry additional request 28 is sometimes a routing information entry deleting request to delete an entry because of the change of the routing protocol and apparatus structure operating in the routing unit 1 or a routing information entry changing request to change the entry contents, though not shown. In either case, the whole operation is the same, but only the method of reflecting on the parts-of-routing-information table 6 of the forwarding unit 2 is different. In addition, when the routing unit 1 and the forwarding unit 2 are independently operated and the packet associated with a satisfying entry arrives before the forwarding unit 2 receives the routing information entry additional request 28, the routing information entry delete entry request or the routing information entry change request from the routing unit 1, the forwarding unit 2 operates according to the current routing information table. At this time, although inconsistency occurs between the parts-of-routing-information table 3 of the routing unit 1 and the parts-of-routing-information table 6 of the forwarding unit 2, this inconsistency is temporary, and thus does not matter. Therefore, the routing unit 1 is able to surely manage the routing information table 26. The transmission of the received IP datagram to the optimum interface may be made after the report of inconsistency to the routing unit 1.

The parts-of-routing-information table 3 and the routing information table 26 may be stored in a memory device which can be independently accessed by the routing unit 1 and the forwarding unit 2. In this case, there is no need for the routing unit 1 to previously distribute the parts-of-routing-information table 6 to the forwarding unit 2. The forwarding unit 2 is able to determine a route on the basis of the parts-of-routing-information table 3 stored in the memory device.

Moreover, in the packet switching apparatus of this embodiment, although the parts-of-routing-information tables 3 and 6 are constructed by the source information 4 and 7 and the destination information 5 and 8, they may formed by only the destination information or the source information. Accordingly, it is possible to construct a network system in which the packet switching apparatus may collect only the destination information or the source information. In addition, if the parts-of-routing-information tables are formed by the source information and the destination information as the packet switching apparatus of this embodiment, the packet switching apparatus is able to relay information between these network systems.

While the packet switching apparatus of this embodiment is used as the router R1 shown in FIG. 2, the packet switching method and apparatus of the present invention may be used as the other routers R2–R6 shown in FIG. 2. In this case, the routers R2, R3, R4 and R6 operate only according to the routing protocol X, and the router R5 operates only according to the routing protocol Y. Also, the packet switching method and apparatus of the present invention can be applied to those not only for multicast communications but also for the unicast communications.

Thus, according to the present invention, in the communication means for calculating a route from the received packet information, a packet switching apparatus can be provided which can force the forwarding unit not to wait for packet switching operation by the order of the route calculating process and packet switching process. Specifically, the packet switching apparatus having the following effects.

(1) In order to reduce the delay in the packet switching due to the fact that the routing unit waits for calculating operation, when a non-registered destination packet is received by the routing information table, the forwarding unit decides if the packet is a packet capable of being relayed so that the packet which is impossible to be relayed is not reported to the routing unit, thereby avoiding the redundant process.

(2) The forwarding unit is prevented from waiting for packet switching, thereby making it possible to remove the process for discarding the packet from the switching waiting queue, which occurs when the routing unit cannot produce the routing information.

(3) Since the switching waiting queue is limited after the report to the routing unit, it is possible to reduce the packets being discarded at the time of congestion.

In addition, since the routing unit and the forwarding unit are constructed by the different separate processors so that the route calculation and switching operation can be physically performed at the same time, the packet switching apparatus of the present invention is able to have the forwarding function with less delay than in the conventional one.

Furthermore, even if the routing unit and the forwarding unit are constructed by the separate task modules of a single processor, the same effect can be expected by proper order of priority of processes though not superior to the case of using the different processors. The packet switching apparatus can also be produced at lower cost than one using the different processors.

What is claimed is:

1. A multicast communications apparatus comprising:
   two or more interfaces coupled to networks, respectively;
   a forwarding unit coupled to said two or more interfaces, said forwarding unit including:
      a storage unit for storing routing information and parts-of-routing-information, said routing information indicating relationships between address information and one or more outgoing interfaces, said address information comprising an arbitrary source address and an arbitrary multicast group address, said parts-of-routing-information indicating relationships between an arbitrary multicast group address and one or more outgoing interfaces;
      a first processing unit, when receiving a multicast packet from an arbitrary interface, for extracting from said routing information one or more outgoing interfaces having correspondence relationships with a multicast group address and a source address contained in said multicast packet, and transmitting said multicast packet from each of said one or more outgoing interfaces, said first processing unit determining said one or more outgoing interfaces to transmit said multicast packet by using said parts-of-routing-information, if said routing information does not contain address information matched with the multicast group address and the source address contained in said multicast packet; and
   a routing unit coupled to said forwarding unit, said routing unit including:
      a second processing unit for creating said parts-of-routing-information by exchanging information with another apparatus over a network, determining, using said parts-of-routing-information, one or more outgoing interfaces to transmit a multicast packet containing an arbitrary multicast group packet and an arbitrary source address, and creating said routing information,
   wherein said second processing unit distributes said parts-of-routing-information and said routing information thus created to said forwarding unit, and
   wherein said forwarding unit stores said parts-of-routing-information and said routing information thus distributed in said storage unit.

2. The multicast communications apparatus according to claim 1, wherein said routing unit further includes a second storage unit for storing said parts-of-routing-information.

3. The multicast communications apparatus according to claim 1, wherein, if said routing information does not contain address information matched with the multicast group address and the source address contained in said multicast packet, said first processing unit of said forwarding unit notifies said routing unit of that said address information is not registered in said routing information.

4. The multicast communications apparatus according to claim 2, wherein:
   if said routing information does not contain address information matched with the multicast group address and the source address contained in said multicast packet, said first processing unit of said forwarding unit notifies said routing unit of said multicast group address and said source address; and
   said second processing unit of said routing unit determines, using said multicast group address and said source address thus notified and said parts-of-routing-information, one or more outgoing interfaces to transmit said multicast packet, registers address information comprising said multicast group address and said source address and said one or more outgoing interfaces thus determined in said routing information so as to have correspondence relationships therebetween, and distributes said routing information thus registered to said forwarding unit.

5. The multicast communications apparatus according to claim 1, wherein:
   said parts-of-routing-information further contains source information indicating correspondence relationships between an arbitrary source address and one or more outgoing interfaces; and
   said first processing unit of said forwarding unit extracts from said source information one or more outgoing interfaces having correspondence relationships with the source address contained in said multicast packet, extracts from said parts-of-routing-information one or more outgoing interfaces having correspondence relationships with the multicast group address contained in said multicast packet, and determines one or more outgoing interfaces to transmit said multicast packet from the one or more outgoing interfaces thus extracted from said source information and the one or more outgoing interfaces thus extracted from said parts-of-routing-information.

6. The multicast communications apparatus according to claim 1, wherein:
   said routing information further indicates correspondence relationships between said address information and an input interface; and
   if said routing information contains address information matched with the multicast group address and the source address contained in said multicast packet, said first processing unit of said forwarding unit compares an interface which received said multicast packet with an input interface having relationships with said address information, and discards said multicast packet, if both the interfaces do not match.

7. The multicast communications apparatus according to claim 1, wherein:
   said parts-of-routing-information further includes source information indicating correspondence relationships between an arbitrary source address and an input interface; and
   said first processing unit of said forwarding unit extracts from said source information an interface having correspondence relationships with the source address contained in said multicast packet, compares an interface which received said multicast packet with the input interface thus extracted, and discards said multicast packet, if both the interfaces do not match.

8. A multicast communications apparatus comprising:
   two or more interfaces coupled to networks, respectively;
   creating means for exchanging information with another apparatus coupled over a network, and creating parts-of-routing-information containing one or more multicast group addresses and one or more outgoing interfaces having corresponding relationships with each multicast group address;

said creating means creating, using said parts-of-routing-information, routing information containing address information and one or more outgoing interfaces having correspondence relationships with each address information, said address information comprising an arbitrary source address and an arbitrary multicast group address;

means for storing said parts-of-routing-information;

means for storing said routing information; and transmitting means, when receiving a multicast packet from an arbitrary interface, for extracting from said routing information one or more outgoing interfaces having corresponding relationships with a multicast group address and a source address contained in said multicast packet, and transmitting said multicast packet from each of said one or more outgoing interfaces, wherein, if said routing information does not contain address information matched with the multicast group address and the source address contained in said multicast packet, said transmitting means determines, using said parts-of-routing-information, one or more outgoing interfaces to transmit said multicast packet, and transmits said multicast packet from each of said one or more outgoing interfaces thus determined.

9. The multicast communications apparatus according to claim 8, wherein, if said routing information does not contain address information matched with the multicast group address and the source address contained in said multicast packet, said transmitting means notifies said creating means of that said address information is not registered in said routing information.

10. The multicast communications apparatus according to claim 8, wherein:

if said routing information does not contain address information matched with the multicast group address and the source address contained in said multicast packet, said transmitting means notifies said creating means of said multicast group address and said source address; and said creating means determines one or more outgoing interfaces to transmit said multicast packet by using said multicast group address and said source address thus notified and said parts-of-routing-information, and adds to said routing information address information comprising said multicast group information and said source address and the one or more outgoing interfaces thus determined so as to have correspondence relationships therebetween.

11. The multicast communications apparatus according to claim 8, wherein:

said creating means further creates source information containing one or more source addresses and one or more outgoing interfaces having correspondence relationships with each of said one or more source addresses;

said transmitting means extracts from said source information one or more outgoing interfaces having correspondence relationships with the source address contained in said multicast packet, extracts from said parts-of-routing-information one or more outgoing interfaces having correspondence relationships with the multicast group address contained in said multicast packet, and determines one or more outgoing interfaces to transmit said multicast packet from said one or more outgoing interfaces extracted from said source information and said one or more outgoing interfaces extracted from said parts-of-routing-information.

12. The multicast communication apparatus according to claim 8, wherein said transmitting means further includes copying means for copying a multicast packet received, and transmits, from each of said one or more outgoing interfaces, the multicast packet received or a multicast packet copied by said copying means.

13. A multicast communications apparatus comprising:

one or more first interfaces coupled to networks, respectively, and complied with a first kind protocol;

one or more second interfaces coupled to networks, respectively, and complied with a second kind protocol;

a first storage unit for storing said one or more first interfaces complied with said first kind protocol and said one or more second interfaces complied with the second kind protocol;

a routing unit for exchanging information with another apparatus coupled over a network, and creating parts-of-routing-information indicating correspondence relationships between each of one or more multicast group addresses and one or more outgoing interfaces according to a protocol kind of each interface;

said routing unit creating, using said parts-of-routing-information, routing information containing address information and one or more outgoing interfaces having correspondence relationships with each address information, said address information comprising an arbitrary source address and an arbitrary multicast group address;

a second storage unit for storing said parts-of-routing-information and said routing information; and a forwarding unit coupled to said routing unit, said one or more first interfaces and said one or more second interfaces, when receiving a multicast packet from an arbitrary interface, for extracting from said routing information one or more outgoing interfaces having correspondence relationships with a multicast group address and a source address contained in said multicast packet, and transmitting said multicast packet from each of the one or more outgoing interfaces thus extracted, wherein, if said routing information does not contain address information matched with the multicast group address and the source address contained in said multicast packet, said forwarding unit determines, using said parts-of-routing-information, one or more outgoing interfaces to transmit said multicast packet, and transmits said multicast packet from each of said one or more outgoing interfaces thus determined.

* * * * *